US006866294B2

(12) United States Patent
Horsch et al.

(10) Patent No.: US 6,866,294 B2
(45) Date of Patent: Mar. 15, 2005

(54) KNEE SUPPORT FOR MOTOR VEHICLES

(75) Inventors: Guido Horsch, Althengstett (DE); Rolf Remensperger, Mengen (DE); Matthias Zierle, Filderstadt (DE); Martin Frank, Muehlacker (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/247,683

(22) Filed: Sep. 20, 2002

(65) Prior Publication Data

US 2003/0057692 A1 Mar. 27, 2003

(30) Foreign Application Priority Data

Sep. 21, 2001 (DE) ........................................ 101 46 494

(51) Int. Cl.[7] ............................................ B60R 21/045

(52) U.S. Cl. .................................. 280/752; 296/187.05

(58) Field of Search ................................ 280/748, 751, 280/752; 188/371, 377; 296/187.05; 297/488

(56) References Cited

U.S. PATENT DOCUMENTS

| | | | | |
|---|---|---|---|---|
| 3,876,228 A | * | 4/1975 | Hawkins et al. | 280/752 |
| 4,709,943 A | | 12/1987 | Yoshimura et al. | |
| 5,037,130 A | | 8/1991 | Okuyama | |
| 5,273,314 A | | 12/1993 | Sakakibara | |
| 5,370,417 A | * | 12/1994 | Kelman et al. | 280/751 |
| 5,518,270 A | * | 5/1996 | Hanada et al. | 280/751 |
| 5,577,770 A | | 11/1996 | Sinner et al. | |
| 5,632,507 A | * | 5/1997 | Sinner et al. | 280/751 |
| 6,086,098 A | | 7/2000 | Reiter et al. | |
| 6,170,872 B1 | * | 1/2001 | Bair et al. | 280/751 |

FOREIGN PATENT DOCUMENTS

| | | |
|---|---|---|
| DE | 4003952 | 8/1991 |
| DE | 19511512 | 2/1996 |
| DE | 19502226 | 5/1996 |
| DE | 19756334 | 7/1999 |
| JP | 5213128 | 8/1993 |
| JP | 07081508 | 3/1995 |

OTHER PUBLICATIONS

Copy of Specification of patent application entitled "Knee Support for Occupants" filed Sep. 20, 2002, under docket No. 037/51339.

European Search Report.

* cited by examiner

*Primary Examiner*—Paul N. Dickson
*Assistant Examiner*—Laura B. Rosenberg
(74) *Attorney, Agent, or Firm*—Crowell & Moring LLP

(57) ABSTRACT

A knee support is arranged inside a body of the motor vehicle and exhibits a transverse frame member, which extends at right angles to the longitudinal direction of the motor vehicle, is held at rigid, lateral body structures, and is provided with at least one deformation element. This deformation element comprises several hollow brackets, defined by bracket walls, and is covered by a support wall, facing the occupants' knees. The deformation element exhibits a first hollow bracket segment, which runs along the support wall, and a second additional hollow bracket segment, which is arranged at an angle to the first hollow bracket segment, whereby the second hollow bracket segment is attached to the transverse frame member.

17 Claims, 3 Drawing Sheets

~2~

1
5
6
7
8
9
10
11
12
14
18
19
20
21
22
23
24
25
26
27
28
29
30
31
32
33
34
37
44
B
C
F
K
E-E
As
Di

KNEE SUPPORT FOR MOTOR VEHICLES

This application claims the priority of German Patent Document No. 101 46 494.0, filed Sep. 21, 2001, the disclosure of which is expressly incorporated by reference herein.

BACKGROUND AND SUMMARY OF THE INVENTION

The invention relates to a knee support for motor vehicles which is arranged inside the body of the motor vehicle in the area of a control panel.

U.S. Pat. No. 4,709,943 discloses a knee support, which is installed in a motor vehicle, is covered by a support wall of a control panel, and exhibits a shock absorbing bracket. The shock absorbing bracket is attached by means of retaining elements to a transverse frame member, which is connected to side frame structures. Impact energy-absorbing devices are provided between the shock absorbing bracket and the retaining elements.

U.S. Pat. No. 5,273,314 discloses a comparable knee support with a deformation element, which extends, as seen in the longitudinal direction of the motor vehicle, from the support wall of the control panel to the transverse frame member. The deformation element is designed along the line of a bracket and exhibits separate bracket walls, which are connected together by means of webs. The thickness of the bracket walls and of the webs varies. That is, it increases starting from the support wall as far as up to the transverse frame member.

The object of the present invention is to improve a deformation element of a knee support in such a manner that it performs a high degree of deformation work during a defined collision and is braced effectively against the body.

The advantages, achieved predominantly with the invention, lie in the fact that owing to the design of the hollow bracket segments and their arrangement in relation to each other, a deformation element is created that specifically absorbs deformation energy for the purpose of largely protecting the occupants of the motor vehicle who are sitting next to the control panel. In this respect, both hollow bracket segments are made compact and can be housed behind the control panel under typically crowded conditions at a reasonable cost. The contour of the bracket walls and the webs of the hollow bracket segments facilitate a reliable deformation behavior of the deformation element. The first and second hollow bracket segments are fitted together to form one component, which is made, for example, of light weight metal and by means of extrusion molding. However, there is also the possibility of forming the hollow bracket segments as multiple parts or of choosing another suitable material for them. Finally, the effect of the deformation element is optimized in such a manner that the transverse frame member, to which the second hollow bracket segment is attached, contributes to the energy absorption during collision-induced deformation of the deformation element.

One embodiment of the invention is depicted in the drawings and is explained in detail below.

Other objects, advantages and novel features of the present invention will become apparent from the following detailed description of the invention when considered in conjunction with the accompanying drawings.

DETAILED DESCRIPTION OF THE DRAWINGS

Figure 5:
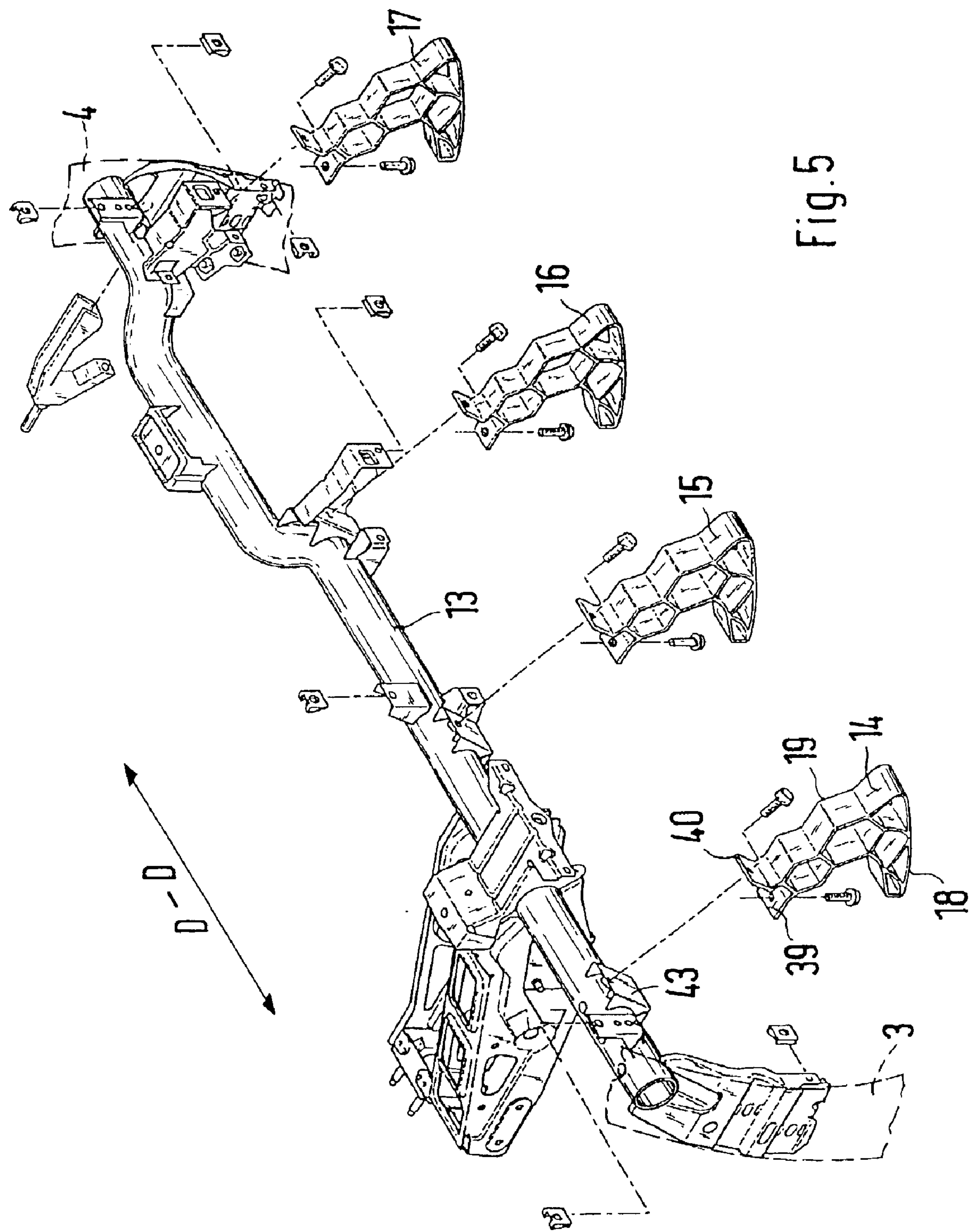
FIG. 5 is an oblique view of a transverse frame member of the knee support with deformation elements, according to the invention.

Of a motor vehicle, for example of the passenger car class, only a control panel 1 is shown that extends at right angles to the motor vehicle longitudinal direction in a passenger compartment 2 between rigid lateral body structures 3, 4, as shown in FIG. 5, or A-pillars. The control panel 1 comprises an angle frame 5, whose side 6, facing the passenger compartment 2, is provided with padding 7. When seen in the cross section, the angle frame 5 exhibits a leg 10, which runs at the bottom at an angle $\alpha$ ranging from approximately 27 degrees to 32 degrees with respect to a horizontal line 8 and which is designed as a support wall 9 rising in the opposite direction of travel B, and an upper leg 11, which faces upward in the direction of travel B. The legs 10 and 11 enclose an angle $\beta$ of approximately 97 degrees. Approximately at C, that is, at the transition between leg 10 and leg 11, the control panel 1 or its support wall 9 is in alignment with the knees K of the occupants, who are sitting in the front seats of the motor vehicle (not shown).

When seen in the direction of travel B, a knee support 12 with a transverse frame member 13, which is held on the side body structures 3, 4, is arranged in front of the control panel 1. The transverse frame member 13 of the knee support 12 is provided with deformation elements 14, 15, 16, 17, which in the event of an accident-induced collision of the motor vehicle, brace the occupants' knees and, above all, absorb the energy of the knee impact in such a manner that the knee force, issuing from C, remains within the specified values.

In the embodiment, the driver side and the front passenger side exhibit two deformation elements 14, 15 or 16, 17, respectively, and in particular, for example, when seen in the motor vehicle transverse direction D—D, laterally outside a structurally defined position of the knees of the driver and the front passenger. However, other types of arrangements of the deformation elements are also conceivable.

Figure 4:
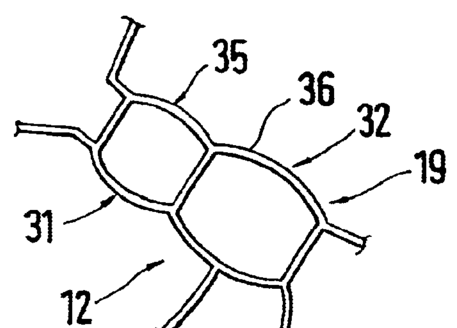
FIG. 4 is a partial view of FIG. 1 with another embodiment.

Each deformation element, for example 14, exhibits a first hollow bracket segment 18, which runs along the support wall 9 of the control panel 1, and a second additional hollow bracket segment 19, both of which constitute a configuration for the defined deformation. The second hollow bracket segment 19 is attached to the transverse frame member 13 of the knee support 12. The first hollow bracket segment 18, extends along the support wall 9. In so doing, a first bracket wall 20, which is designed as a flat or convex surface and belongs to the first hollow bracket segment 18, runs equidistant from the support wall 9, and it defines the hollow brackets 21, 22, 23, 24. A second bracket wall 25 of the first hollow bracket segment 18 is arranged separately from the first bracket wall 20, between which there are webs 26, 27, 28, which run at an angle to each other and which form a type of diagonal ribbing. They form the hollow brackets 21, 22, 23, 24 area by area. The second hollow bracket segment 19 is led away from the second bracket wall 25 and exhibits, when seen in a longitudinal direction E—E of the latter said hollow bracket segment, two hollow brackets 29, 30, which are arranged in succession and which are represented segmentally by a third bracket wall 31 and a fourth bracket wall 32. The bracket walls 31 and 32 are braced by means of transverse webs 33, 34, 34 in such a manner that they form for each hollow bracket 29 and 30 a honeycomb structure, whose cross section is hexagonal. According to FIG. 4, the bracket walls 31 and 32 are provided with convex wall segments 35 and 36 so that the hollow brackets 29, 30 exhibit a rectangular cross section in this embodiment. In addition, a central longitudinal plane F—F of the second hollow bracket segment 19 extends at an acute angle $\gamma$ of approximately 80 degrees to the straight line 37, along which the first bracket wall 20 of the first hollow bracket segment 18 runs.

Figure 3:
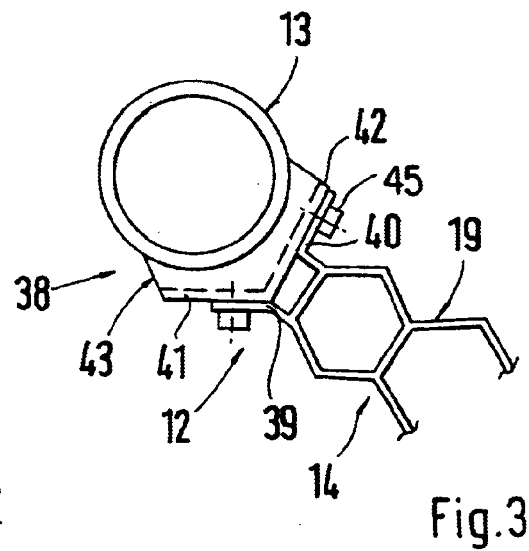
FIG. 3 is a partial view of FIG. 1.

The second hollow bracket segment 19 is provided on the side 38, as seen in FIG. 3, facing the transverse frame member 13, with attachment flanges 39, 40, which are arranged at an angle to each other and which connect to the connecting flanges 41, 42 of a bracket 43 of the transverse frame member. Between the attachment flanges 39, 40 and the connecting flanges 41, 42, suitable fastening means, for example screws 45, are effective. In this respect the first hollow bracket segment 18 and the second hollow bracket segment 19 are arranged in such a manner to the transverse frame member 13, exhibiting a circular tube cross section, that it contributes by means of torsion to optimizing the knee support 12.

Figure 1:
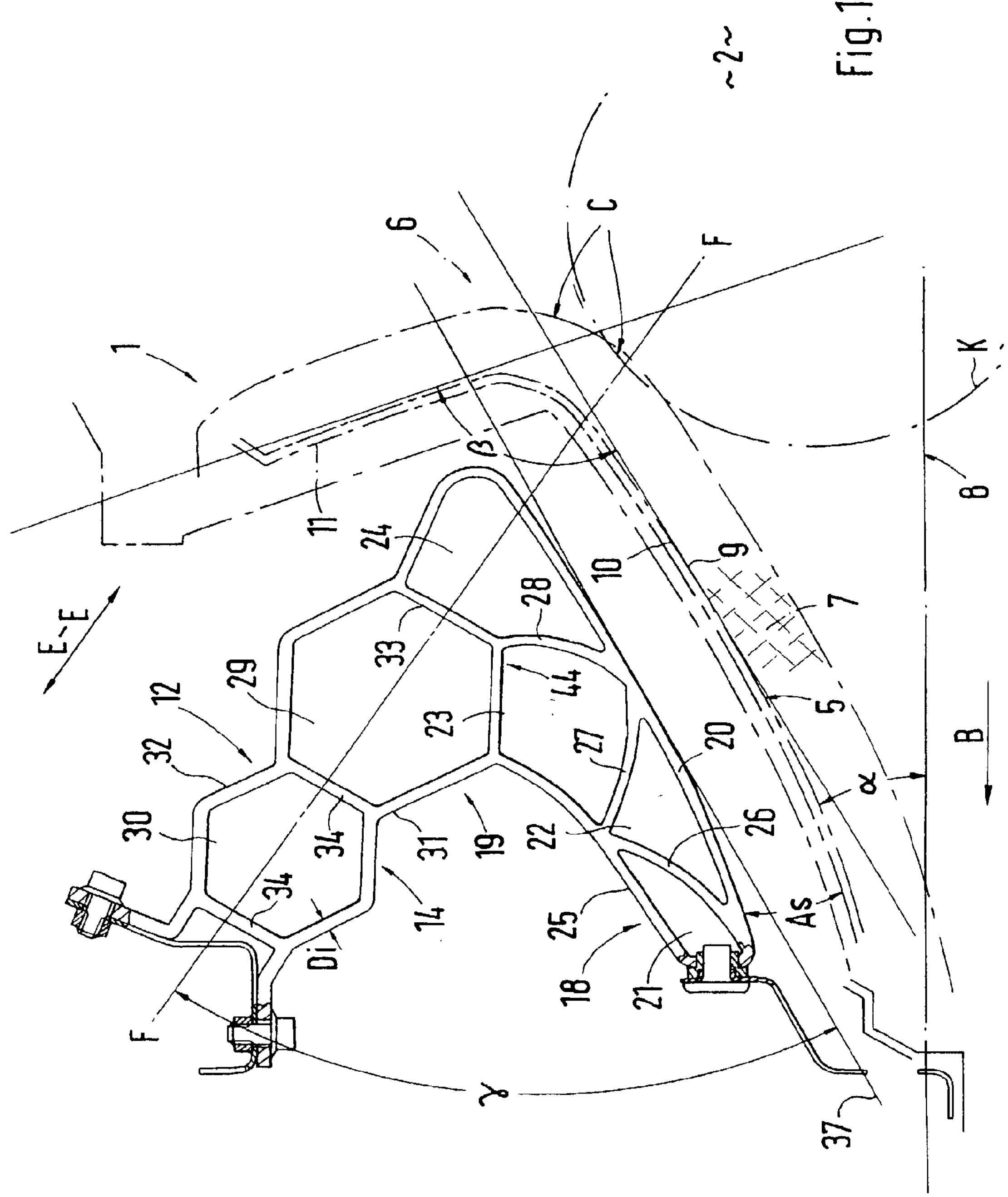
FIG. 1 is a partial longitudinal view of a motor vehicle in the area of a control panel with the knee support, according to an embodiment of the invention.
Figure 2:
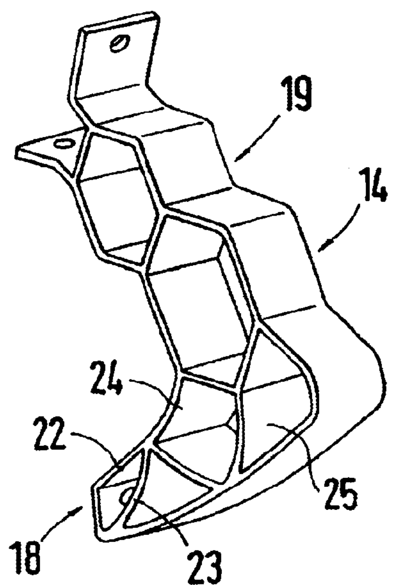
FIG. 2 is an oblique view of a detail of FIG. 1 on a smaller scale.

In an embodiment the first hollow bracket segment 18 and the second hollow bracket segment 19 are made from one piece as an extruded part light-weight metal, steel, plastic, where the bracket walls 20, 25, 31 and 32; the webs 26, 27 and 28 as well as the transverse webs 33, 34 exhibit a constant thickness Di, as shown in FIG. 1. However, it is also conceivable that the hollow bracket segments 18 and 19 are designed as separate components and then they are connected together at 44.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A knee support for motor vehicles, which is arranged in an area of a control panel inside a body of the motor vehicle and exhibits a transverse frame member, which extends at right angles to a longitudinal direction of the motor vehicle, is held at rigid, lateral body structures, and is provided with at least one generally V-shaped deformation element, which deformation element comprises several hollow brackets and is covered with a support wall of the control panel, facing knees of occupants of the motor vehicle, wherein the deformation element exhibits a first hollow bracket segment which runs without contact along the support wall of the control panel and a second hollow bracket segment which is arranged at an angle in relation to the first hollow bracket segment, whereby the second hollow bracket segment is attached, at an end remote from the first hollow bracket, directly to the transverse frame member.

2. The knee support, as claimed in claim 1, wherein the first hollow bracket segment exhibits at least one bracket wall which defines two first hollow brackets and which runs at a distance from the support wall of the control panel.

3. The knee support, as claimed in claim 2, wherein the bracket wall of the first hollow bracket segment is designed as a plane or convex surface and runs equidistant with respect to the support wall of the control panel.

4. The knee support, as claimed in claim 2, wherein, separated from the bracket wall, a second bracket wall extends at the first hollow bracket segment, whereby between the bracket wall and the second bracket wall there are webs which run at an angle to each other.

5. The knee support, as claimed in claim 4, wherein the second hollow bracket segment is led away from the second bracket wall and exhibits at least two second hollow brackets which are formed in segments by a third bracket wall and a fourth bracket wall.

6. The knee support, as claimed in claim 5, wherein, when seen in a central longitudinal plane of the second hollow bracket segment, the two second hollow brackets exhibit transverse webs and the third and fourth bracket walls.

7. The knee support, as claimed in claim 6, wherein the transverse webs and the third and fourth bracket walls form a hexagonal honeycomb structure.

8. The knee support, as claimed in claim 6, wherein at least the bracket walls, the webs and the transverse webs of the hollow bracket segments exhibit a constant thickness.

9. The knee support, as claimed in claim 5, wherein the third and fourth bracket walls form convex wall segments in an area of the two second hollow brackets.

10. The knee support, as claimed in claim 2, wherein a central longitudinal plane of the second hollow bracket segment and the bracket wall run at an angle, preferably an acute angle, to each other.

11. The knee support, as claimed in claim 1, wherein the second hollow bracket segment exhibits on a side, facing the transverse frame member, attachment flanges which are held in position with connecting flanges of the transverse frame member with insertion of fastening means.

12. The knee support, as claimed in claim 1, wherein the first hollow bracket segment and the second hollow bracket segment of the deformation element are made of one piece.

13. The knee support, as claimed in claim 1, wherein the hollow bracket segments and the transverse frame member are arranged in such a manner in relation to each other that the transverse frame member contributes by means of torsion to optimizing a deformation of the knee support.

14. A knee support for a motor vehicle, comprising:

a transverse frame member including at least one generally V-shaped deformation element wherein the deformation element includes a first hollow bracket segment and a second hollow bracket segment and wherein the second hollow bracket segment is attached, at an end remote from the first hollow bracket, directly to the transverse frame member and is arranged at an angle in relation to the first hollow bracket segment, wherein the first hollow bracket segment exhibits at least one bracket wall which defines two first hollow brackets and which runs at a distance from a support wall of a control panel of the motor vehicle.

15. The knee support, as claimed in claim 14, wherein, separated from the bracket wall, a second bracket wall extends at the first hollow bracket segment, whereby between the bracket wall and the second bracket wall there are webs which run at an angle to each other.

16. The knee support, as claimed in claim 14, wherein a central longitudinal plane of the second hollow bracket segment and the bracket wall run at an acute angle to each other.

17. A knee support for a motor vehicle, comprising:

a transverse frame member including at least one generally V-shaped deformation element wherein the deformation element includes a first hollow bracket segment and a second hollow bracket segment and wherein the second hollow bracket segment is attached, at an end remote from the first hollow bracket, directly to the transverse frame member and is arranged at an angle in relation to the first hollow bracket segment, wherein the second hollow bracket segment exhibits on a side, facing the transverse frame member, an attachment flange which is held in position with a connecting flange of the transverse frame member with insertion of a fastener.

* * * * *